(12) United States Patent
Lim

(10) Patent No.: US 9,103,682 B2
(45) Date of Patent: Aug. 11, 2015

(54) APPARATUS FOR APPLYING MULTI-AXIAL INERTIAL FORCE

(75) Inventor: Jun Lim, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 879 days.

(21) Appl. No.: 13/309,956

(22) Filed: Dec. 2, 2011

(65) Prior Publication Data

US 2012/0139175 A1    Jun. 7, 2012

(30) Foreign Application Priority Data

Dec. 7, 2010    (KR) .......................... 10 2010 0124297

(51) Int. Cl.

| | |
|---|---|
| G01C 25/00 | (2006.01) |
| G01C 21/16 | (2006.01) |
| G01P 21/00 | (2006.01) |
| B25B 5/00 | (2006.01) |
| B25B 1/20 | (2006.01) |

(52) U.S. Cl.
   CPC .............. *G01C 25/005* (2013.01); *G01C 21/16* (2013.01); *G01P 21/00* (2013.01); *B25B 1/20* (2013.01); *B25B 5/00* (2013.01)

(58) Field of Classification Search
   CPC .......... B25B 1/20; B25B 1/2457; B25B 5/00; B25B 5/06; B25B 13/28
   USPC ................ 269/86, 43, 45, 271, 71, 75, 55, 60
   See application file for complete search history.

(56) References Cited

U.S. PATENT DOCUMENTS

| | | | | |
|---|---|---|---|---|
| 4,341,375 | A | * | 7/1982 | Romanin ......................... 269/43 |
| 6,009,916 | A | * | 1/2000 | Krumm ............................ 139/54 |
| 6,375,178 | B1 | * | 4/2002 | Schilb et al. .................... 269/71 |
| 6,860,800 | B1 | * | 3/2005 | Maurer ......................... 451/364 |
| 7,635,119 | B1 | * | 12/2009 | Patel ............................... 269/73 |
| 8,720,877 | B2 | * | 5/2014 | Kawamura et al. ............. 269/58 |
| 2012/0139175 | A1 | * | 6/2012 | Lim ............................... 269/86 |

FOREIGN PATENT DOCUMENTS

| | | |
|---|---|---|
| EP | 2088396 | 8/2009 |
| JP | 10-002914 A | 1/1998 |
| JP | 2006-260046 A | 9/2006 |

OTHER PUBLICATIONS

European Search Report dated Nov. 5, 2013 from corresponding EP Patent Application No. 11275149.0.

(Continued)

*Primary Examiner* — Lee D Wilson
(74) *Attorney, Agent, or Firm* — Ladas & Parry, LLP

(57) ABSTRACT

Disclosed herein is an apparatus for applying multi-axial inertial force, the apparatus including: a lower support plate; two first support members fixed to stand up from the lower support plate; a second support member positioned to be orthogonal to inner sides of the two first support member in a stand-up direction thereof and rotatably coupled to the first support member; and a third support member stacked on the second support member and coupled to the second support member so as to be rotatable based on a rotational axis corresponding to a stacked direction. Therefore, it is possible to obtain an apparatus for applying multi-axial inertial force in which vibration excitation and rotation may be performed in multiple-axes directions using a uni-axial inertial force generator that may be vibration-excited and rotated only in a single direction.

11 Claims, 4 Drawing Sheets

(56) References Cited

OTHER PUBLICATIONS

Xie Yue, et al. "Modeling and robust adaptive control of a 3-axis motion simulator." Conference Record of the 2001 IEE Industry Applications Conference. 36$^{th}$ IAS Annual Meeting. Chicago, Il., Sep. 30-Oct. 4, 2011. vol. 1, pp. 553-569,.

Applicant-provided Office Action issued for related Japanese Patent Application No. 2011-253623, dated Dec. 25, 2012, and its English summary, also provided by the Applicant.

* cited by examiner

APPARATUS FOR APPLYING MULTI-AXIAL INERTIAL FORCE

CROSS REFERENCE TO RELATED APPLICATION

This application claims the benefit of Korean Patent Application No. 10-2010-0124297, filed on Dec. 7, 2010, entitled "Apparatus for Apply Multiaxial-Inertial Force", which is hereby incorporated by reference in its entirety into this application.

BACKGROUND OF THE INVENTION

1. Technical Field

The present invention relates to an apparatus for applying multi-axial inertial force.

2. Description of the Related Art

Recently, as a small and light inertial sensor is easily manufactured using a micro electro mechanical system (MEMS) technology, application fields of the inertial sensor have been expanded to home appliances, etc. Therefore, in accordance with the continuous development of functions of the inertial sensor, the function of the inertial sensor has been continuously developed from a uni-axial sensor capable of detecting only an inertial force for a single axis using a single sensor to a multi-axial sensor capable of detecting an inertia force for a multi-axis of two axes or more using a single sensor.

The manufactured inertial sensor is necessarily subjected to a performance test before being released as a product. Since the inertial sensor is a transducer transducing inertial force (angular velocity, acceleration) applied to the sensor into electrical signals, performance thereof may be confirmed by applying the inertial force directly to the sensor and measuring an electrical output.

However, as the function of the inertial sensor has been expanded from the single axis to the multiple axes, a direction of inertial force that should be applied to the sensor at the time of measurement should also be increased from the single axis to the multiple axes, which causes a structure or a function of an apparatus for applying inertial force to be significantly complicated.

A tri-axial ratetable according to the prior art for this has volume three times or more larger than that of a uni-axial ratetable and is significantly more expensive than the uni-axial ratetable. Particularly, a vibration exciter used for generating linear acceleration may not generate tri-axial simultaneous vibration-excitation using a single apparatus, such that the sensor to be measured should be measured while moving the apparatus for each axis.

Due to the above-mentioned reason, a time required to test the multi-axial inertial sensor becomes significantly longer than a time required to test the uni-axial inertial sensor. An increase in test time, which is directly associated with an increase in product cost, is an important factor deteriorating competitiveness of a product.

Further, in the case of a tri-axial angular velocity sensor that may detect inertial force in three-axes directions, since characteristics thereof should be evaluated with respect to all of the three-axes directions that are orthogonal to each other, an apparatus for applying tri-axial angular velocity is required. However, the apparatus for applying tri-axial angular velocity according to the prior art has volume significantly larger than that of an apparatus for applying uni-axial angular velocity. In addition, the number of components used in the apparatus for applying tri-axial angular velocity becomes three times or more as compared to the apparatus for applying uni-axial angular velocity. In the apparatus for applying tri-axial angular velocity, an expensive and significantly precise motor is required, and significantly elaborate components such as an angle encoder that may detect a rotation amount, a slip ring connecting an electrical signal to the outside of a shaft of the motor, or the like, are used. Therefore, when the number of axes increases, components as much as a multiple of the number of increased axes are required. In addition, the slip ring serves as a channel connecting a signal output from a device under test (DUT) to an external measuring device. Since the slip ring itself becomes a noise source at the time of rotation of the motor, as the number of slip rings through which the electrical signal passes increases, a noise component of the channel increases.

Further, in the case of the vibration exciter or a linear acceleration generator, it is very difficult to generate acceleration in the multiple axes using a single apparatus. Therefore, several uni-axial vibration exciters are generally fixed and used in each axis direction. In this case, in order to perform multi-axial measurement, the DUT should be moved to and mounted on several vibration exciters set according to the directions of the axes, a test time is significantly increased, and several apparatuses for applying acceleration are required for each of the directions of the axes, such that a cost required to configure a measuring system is also increased.

SUMMARY OF THE INVENTION

The present invention has been made in an effort to provide an apparatus for applying multi-axial inertial force that may apply vibration and rotation in three-axes directions using a uni-axial vibration exciter.

According to a preferred embodiment of the present invention, there is provided an apparatus for applying multi-axial inertial force, the apparatus including: a lower support plate; two first support members fixed to stand up from the lower support plate; a second support member positioned to be orthogonal to inner sides of the two first support member in a stand-up direction thereof and rotatably coupled to the first support member; and a third support member stacked on the second support member and coupled to the second support member so as to be rotatable based on a rotational axis corresponding to a stacked direction.

The third support member may include a device under test (DUT) seating part formed in the stacked direction.

The apparatus may further include a direction changing lever coupled to the second support member in the rotational axis direction, wherein the direction changing lever is rotatably coupled to an outer side portion of the first support member.

The second support member may be provided with a coupling hole to which the direction changing lever is coupled and fixed.

The first support member may be provided with a support hole through which the direction changing lever penetrates.

The apparatus may further include a direction changing lever coupled to the third support member.

The apparatus may further include an auxiliary support plate connected to the first and second support members and supporting the second support member.

The second support member may be provided with an insertion protrusion corresponding to the auxiliary support plate, and the auxiliary support plate may be provided with a fixing groove corresponding to the insertion protrusion.

The apparatus may further include a driving device moving each of the second and third support members.

DESCRIPTION OF THE PREFERRED EMBODIMENTS

Figure 1:
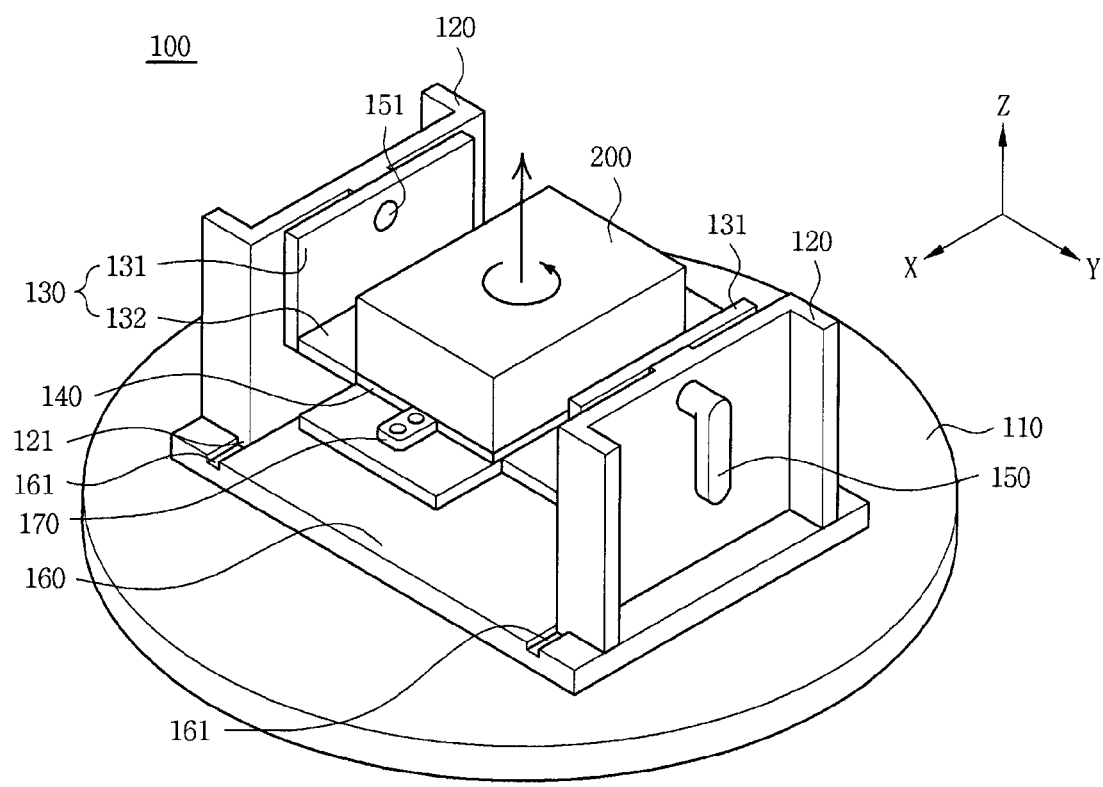
FIG. 1 is a schematic use state view of an apparatus for applying multi-axial inertial force according to a first preferred embodiment of the present invention.

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. Further, when it is determined that the detailed description of the known art related to the present invention may obscure the gist of the present invention, the detailed description thereof will be omitted.

Hereinafter, an apparatus for applying multi-axial inertial force according to preferred embodiments of the present invention will be described with reference to the accompanying drawings.

FIG. 1 is a schematic use state view of an apparatus for applying multi-axial inertial force according to a first preferred embodiment of the present invention. As shown, the apparatus 100 for applying multi-axial inertial force is configured to include a lower support plate 110, a first support member 120, a second support member 130, and a third support member 140.

More specifically, the lower support plate 110 is connected to a driving unit (not shown) to transfer rotation or vertical vibration.

The first support member 120 is fixed to stand up from the lower support plate 110.

In addition, the second support member 130 is positioned to be orthogonal to the first support member 120 in a stand-up direction thereof, and is rotatably coupled to the first support member 120. To this end, the apparatus 100 for applying multi-axial inertial force further includes a direction changing lever 150 coupled to the second support member 130 in a rotational axis direction, the second support member 130 is provided with a coupling hole (not shown), the first support member 120 is provided with a support hole (not shown), and the direction changing lever 150 is provided with a coupling protrusion 151, wherein the coupling protrusion 151 is coupled to the coupling hole simultaneously with penetrating through and being supported by the support hole. Through the above-mentioned configuration, the second support member 130 may move in a rotation direction with respect to the first support member by the direction changing lever 150. In addition, the second support member 130 includes a sidewall part 131 coupled to an inner side of the first support member and a support part 132 orthogonal to the sidewall part 131, and the coupling hole is formed in the sidewall part.

Further, the third support member 140 is stacked on the second support member and is coupled to the second support member so as to be rotatable based on a rotational axis corresponding to a stacked direction. In addition, the third support member 140 includes a device under test (DUT) seating part (not shown) formed in the stacked direction. The DUT seating part includes an inertial sensor 200, or the like, mounted thereon.

The apparatus 100 for applying multi-axial inertial force further includes a direction changing lever 170 coupled to the third support member 140. The third support member 140 rotates with respect to the second support member 130 by operating the direction changing lever 170.

The apparatus 100 for applying multi-axial inertial force further includes an auxiliary support plate 160 connected to the first and second support members 120 and 130 and supporting the second support member 130. The second support member 130 is provided with an insertion protrusion 121 corresponding to the auxiliary support plate, and the auxiliary support plate 160 is provided with a fixing groove 161 corresponding to the insertion protrusion.

The apparatus 100 for applying multi-axial inertial force may further include a driving device moving each of the second and third support members.

In the above-mentioned configuration, a use state in which a Z axis is set to the rotational axis direction and inertial force is then applied is shown in FIG. 1.

Figure 2:
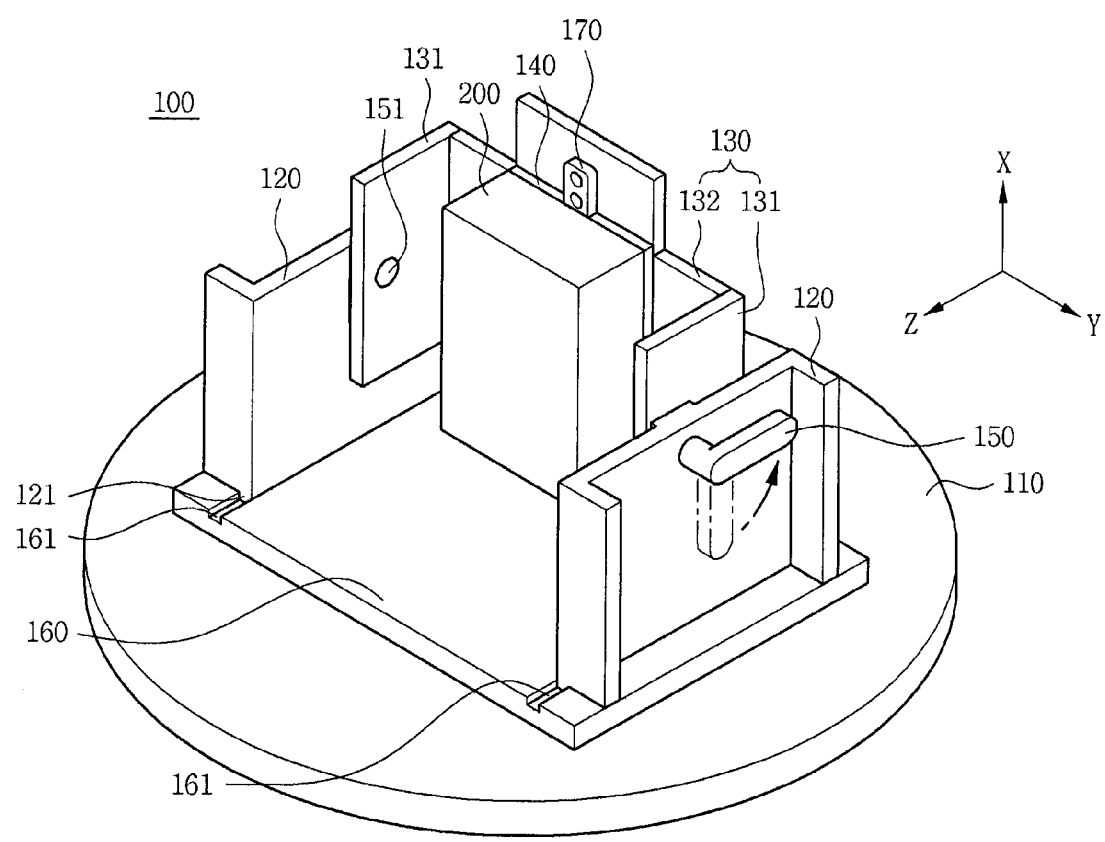
FIG. 2 is a schematic use state view of an apparatus for applying multi-axial inertial force according to a second preferred embodiment of the present invention.

FIG. 2 is a schematic use state view of an apparatus for applying multi-axial inertial force according to a second preferred embodiment of the present invention. As shown, when the direction changing lever 150 rotates in a counterclockwise direction, which is an arrow direction, in the apparatus for applying multi-axial inertial force shown in FIG. 1, the second support member 130 rotates with respect to the first support member 120 by −90 degrees. FIG. 1 shows the use state in which the Z axis is set to the rotational axis direction and the inertial force is then applied; however, FIG. 2 shows the use state in which an X axis is set to the rotational axis direction and the inertial force is then applied.

Figure 3:
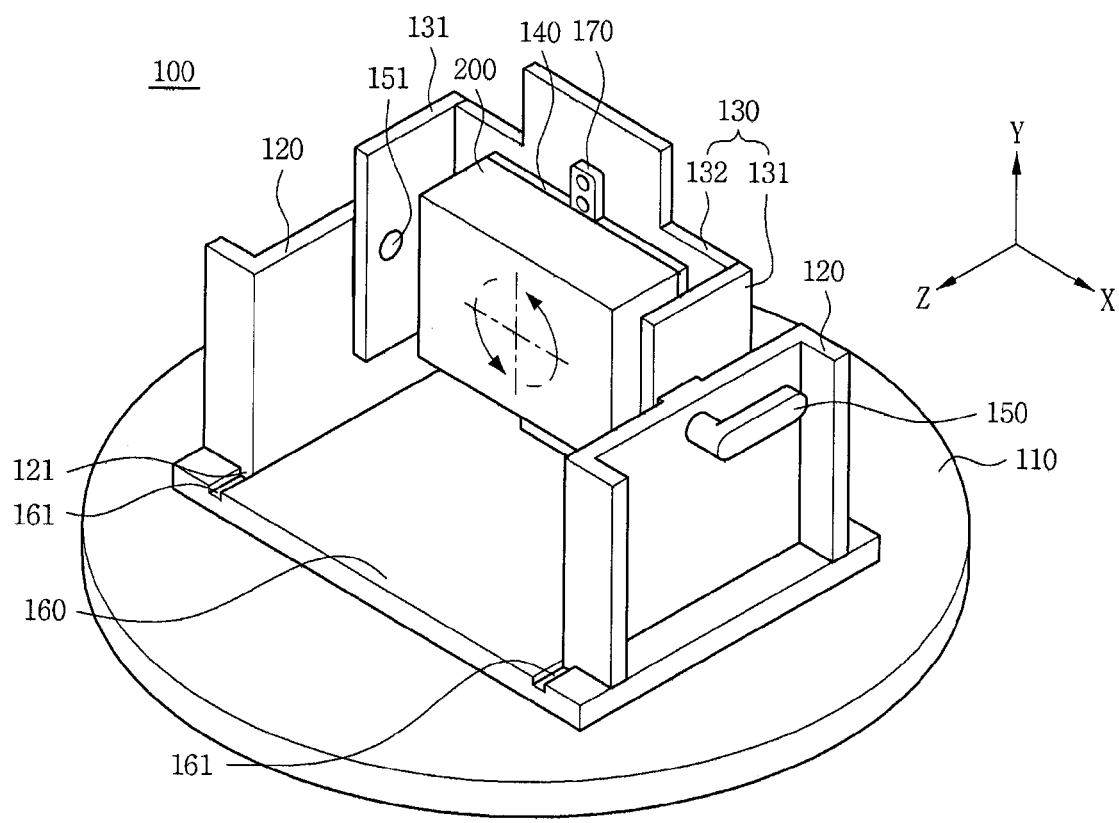
FIG. 3 is a schematic use state view of an apparatus for applying multi-axial inertial force according to a third preferred embodiment of the present invention.

FIG. 3 is a schematic use state view of an apparatus for applying multi-axial inertial force according to a third preferred embodiment of the present invention. As shown, when the direction changing lever 170 rotates in a counterclockwise direction, which is an arrow direction, in the apparatus for applying multi-axial inertial force shown in FIG. 2, the third support member 140 rotates with respect to the second support member 130 by −90 degrees. FIG. 2 shows the use state in which the X axis is set to the rotational axis direction and the inertial force is then applied; however, FIG. 3 shows the use state in which a Y axis is set to the rotational axis direction and the inertial force is then applied.

Through the above-mentioned configuration, the apparatus for applying multi-axial inertial force according to the preferred embodiment of the present invention may change the axis of the inertial force applied to the inertial sensor 200 by the first to third support members even though vibration excitation and rotation directions are always constant. As a result, vibration excitation and rotation may be performed in multiple-axes directions using a uni-axial inertial force generator that may be vibration-excited and rotated only in a single direction. In addition, the apparatus for applying multi-axial inertial force according to the preferred embodiment of the present invention needs not to be precise as in the motor applying the inertial force according to the prior art or include an angle encoder recognizing rotation of the motor and a slip ring for securing an electrical connection channel with the DUT, such that it may be very cheaply and simply implemented.

Figure 4:
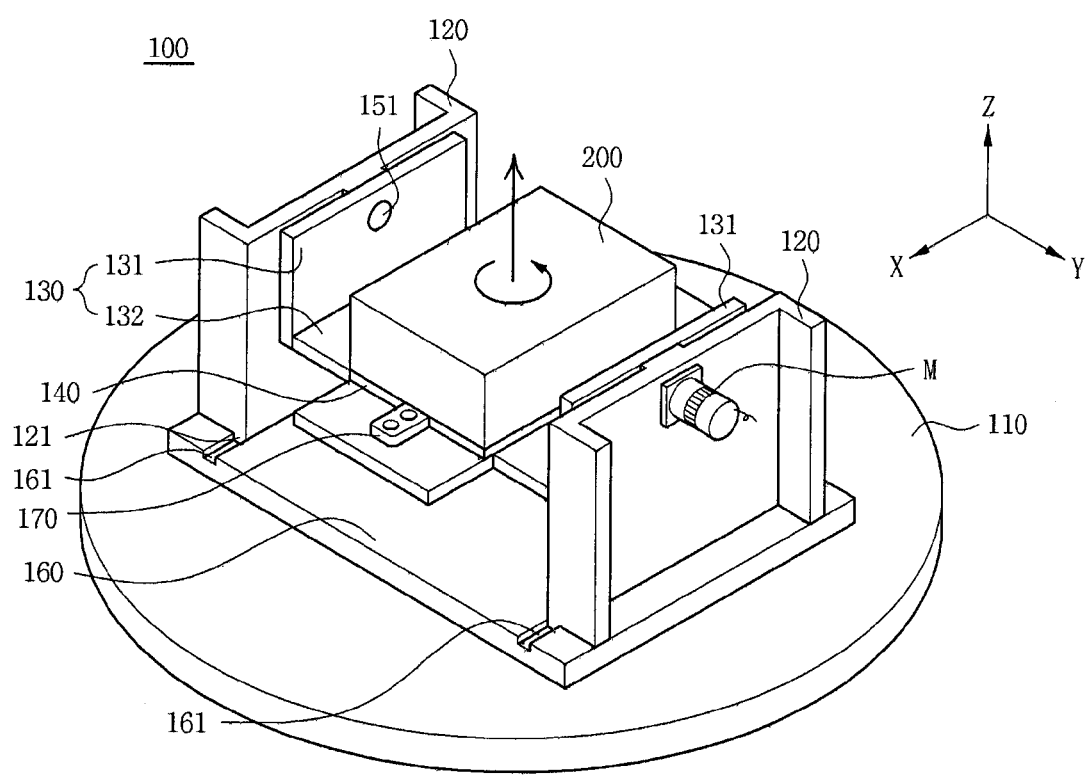
FIG. 4 is a schematic perspective view of an apparatus for applying multi-axial inertial force according to another preferred embodiment of the present invention.

FIG. 4 is a schematic perspective view of an apparatus for applying multi-axial inertial force according to another preferred embodiment of the present invention. As shown, the apparatus for applying multi-axial inertial force rotates the second support member 130 using a motor M instead of the direction changing lever 150 shown in FIG. 1. In addition, the apparatus for applying multi-axial inertial force may also include a separate motor (not shown) to move the third support member.

According to the preferred embodiment of the present invention, it is possible to obtain an apparatus for applying multi-axial inertial force in which vibration excitation and rotation may be performed in multiple-axes directions using a uni-axial inertial force generator that may be vibration-excited and rotated only in a single direction. The apparatus for applying multi-axial inertial force may have a simplified configuration and be implemented at a low cost. Further, in the apparatus for applying multi-axial inertial force, the number of slip rings is reduced as compared to the apparatus for applying multi-axial inertial force according to the prior art, such that noise and a measuring time are reduced.

Although the embodiment of the present invention has been disclosed for illustrative purposes, it will be appreciated that an apparatus for applying multi-axial inertial force according to the invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. An apparatus for applying multi-axial inertial force to an inertial sensor, the apparatus comprising:
   a lower support plate connected to a driving unit to transfer rotation or vertical vibration;
   a first support member fixed to stand up from the lower support plate;
   a second support member positioned to be orthogonal to the first support member in a stand-up direction thereof and rotatably coupled to the first support member; and
   a third support member stacked on the second support member and coupled to the second support member so as to be rotatable based on a rotational axis corresponding to a stacked direction,
   wherein the third support member includes a device under test (DUT) seating part formed in the stacked direction, and the inertial sensor is seated on the device under test (DUT) seating part.

2. The apparatus as set forth in claim 1, wherein the first support member is provided in pair, and the second support member is positioned to be orthogonal to an inner side of the first support member in the stand-up direction.

3. The apparatus as set forth in claim 1, wherein the third support member includes the device under test (DUT) seating part formed in the stacked direction.

4. The apparatus as set forth in claim 1, further comprising a direction changing lever coupled to the second support member in the rotational axis direction.

5. The apparatus as set forth in claim 4, wherein the second support member is provided with a coupling hole to which the direction changing lever is coupled and fixed.

6. The apparatus as set forth in claim 4, wherein the direction changing lever is rotatably coupled to an outer side portion of the first support member.

7. The apparatus as set forth in claim 6, wherein the first support member is provided with a support hole through which the direction changing lever penetrates.

8. The apparatus as set forth in claim 1, further comprising a direction changing lever coupled to the third support member.

9. The apparatus as set forth in claim 1, further comprising an auxiliary support plate connected to the first and second support members and supporting the second support member.

10. The apparatus as set forth in claim 9, wherein the second support member is provided with an insertion protrusion corresponding to the auxiliary support plate, and the auxiliary support plate is provided with a fixing groove corresponding to the insertion protrusion.

11. The apparatus as set forth in claim 1, further comprising a driving device moving each of the second and third support members.

\* \* \* \* \*